US009216337B2

(12) United States Patent
Carroll et al.

(10) Patent No.: US 9,216,337 B2
(45) Date of Patent: Dec. 22, 2015

(54) OVERMOLDED GOLF TEE AND METHOD OF MAKING IT

(71) Applicant: Green Keepers, Inc., Philadelphia, PA (US)

(72) Inventors: Francis Carroll, Philadelphia, PA (US); James Carroll, Jr., Richboro, PA (US)

(73) Assignee: Green Keepers, Inc., Philadelphia, PA (US)

( * ) Notice: Subject to any disclaimer, the term of this patent is extended or adjusted under 35 U.S.C. 154(b) by 0 days.

(21) Appl. No.: 14/169,944

(22) Filed: Jan. 31, 2014

(65) Prior Publication Data

US 2014/0228154 A1    Aug. 14, 2014

Related U.S. Application Data

(60) Provisional application No. 61/758,916, filed on Jan. 31, 2013.

(51) Int. Cl.
*A63B 57/00* (2015.01)
*B29C 45/14* (2006.01)
*B29L 31/52* (2006.01)
*B29C 45/16* (2006.01)
*A63B 71/06* (2006.01)

(52) U.S. Cl.
CPC ....... *A63B 57/0018* (2013.01); *B29C 45/14336* (2013.01); *A63B 2071/0694* (2013.01); *A63B 2209/00* (2013.01); *B29C 45/1676* (2013.01); *B29L 2031/52* (2013.01)

(58) Field of Classification Search
CPC ............... A63B 57/00; A63B 57/0043; A63B 57/0018; A63B 69/0075; A63B 2209/00; B29C 45/15336; B29C 45/1676; B29L 2031/52

See application file for complete search history.

(56) References Cited

U.S. PATENT DOCUMENTS

| | | | |
|---|---|---|---|
| 638,920 A | 12/1899 | Grant | |
| 1,542,505 A * | 6/1925 | Jacobus | ........................ 473/401 |
| 1,551,207 A | 8/1925 | Nial et al. | |
| 1,554,321 A | 9/1925 | Banigan | |
| 1,573,911 A | 2/1926 | Budrow | |
| 1,588,038 A | 6/1926 | Miller | |
| 1,679,579 A | 8/1928 | Lundy | |
| D78,530 S | 5/1929 | McLeod | |
| 1,981,810 A * | 11/1934 | Parkhurst | ...................... 473/402 |
| 2,531,470 A | 11/1950 | Richard | |

(Continued)

FOREIGN PATENT DOCUMENTS

EP    1072291    1/2001
JP    04189374   7/1992

(Continued)

OTHER PUBLICATIONS

Advertisement for "Zero Friction Golf Tee," retrieved from www.zerofrictiontees.com on Aug. 28, 2008.

(Continued)

*Primary Examiner* — Steven Wong
(74) *Attorney, Agent, or Firm* — Blank Rome LLP

(57) ABSTRACT

A golf tee has a stake made of a first material and a crown made of a second material more flexible than the first material, in which the crown is overmolded over the stake. The crown and the stake can have corresponding projections. The stake can have projections to allow the crown and the stake to hold together better.

16 Claims, 15 Drawing Sheets

(56) References Cited

U.S. PATENT DOCUMENTS

| | | | |
|---|---|---|---|
| D200,543 S | 3/1965 | Thomte | |
| 3,414,268 A | 12/1968 | Chase | |
| 3,633,919 A | 1/1972 | Liccardello | |
| 3,645,537 A | 2/1972 | Parenteau | |
| 4,893,818 A * | 1/1990 | Liccardello | 473/396 |
| 5,372,362 A | 12/1994 | Barker | |
| 5,413,348 A | 5/1995 | Basso | |
| D369,845 S | 5/1996 | Knez | |
| 5,759,118 A | 6/1998 | Sroczynski | |
| 6,224,500 B1 * | 5/2001 | Mizohata | 473/396 |
| 6,508,727 B1 * | 1/2003 | Su | 473/387 |
| 6,849,008 B1 | 2/2005 | Wang | |
| D516,146 S | 2/2006 | Iacono et al. | |
| 7,011,586 B2 | 3/2006 | Toyosawa et al. | |
| 7,090,594 B2 | 8/2006 | Kawashima et al. | |
| 7,156,758 B2 | 1/2007 | Lu | |
| D543,597 S | 5/2007 | Lee et al. | |
| 7,344,456 B2 | 3/2008 | Hayton | |
| D566,802 S | 4/2008 | Carroll et al. | |
| 7,704,166 B2 | 4/2010 | Lim | |
| 8,430,769 B2 * | 4/2013 | Kim | 473/387 |
| 2002/0198066 A1 | 12/2002 | Salsman | |
| 2004/0166964 A1 | 8/2004 | Toyosawa et al. | |
| 2005/0003907 A1 | 1/2005 | Ijiri | |
| 2005/0130769 A1 | 6/2005 | Olsen | |
| 2005/0187041 A1 | 8/2005 | Kawashima et al. | |
| 2006/0276269 A1 | 12/2006 | Kihara | |
| 2007/0149324 A1 | 6/2007 | Tsai | |
| 2007/0298910 A1 | 12/2007 | Potempa et al. | |
| 2008/0070724 A1 | 3/2008 | Elder | |
| 2008/0119305 A1 | 5/2008 | Wong | |
| 2008/0182684 A1 | 7/2008 | Carroll et al. | |
| 2012/0028734 A1 | 2/2012 | MacKeen | |

FOREIGN PATENT DOCUMENTS

| | | |
|---|---|---|
| JP | 2005021611 A | 1/2005 |
| JP | 2005296330 | 10/2005 |
| JP | 2006341016 A | 12/2006 |
| KR | 20010099365 | 11/2001 |
| WO | 2005/032668 | 4/2005 |

OTHER PUBLICATIONS

Microfilmed Text of Japanese Utility Model Application No. SHO 47-117361 (Japanese Utility Model Public Disclosure No. SHO 49-73560).

Microfilmed Text of Utility Model Application No. HEI 2-59955 (Japanese Utility Model Public Disclosure No. HEI 4-18553).

Japanese Patent Public Disclosure No. 2005-296330.

Microfilmed Text of Utility Model Application No. SHO 48-73686 (Japanese Utility Model Pbulic Disclosure No. SHO 50-20773).

* cited by examiner

OVERMOLDED GOLF TEE AND METHOD OF MAKING IT

REFERENCE TO RELATED APPLICATION

The present application claims the benefit of U.S. Provisional Patent Application No. 61/758,916, filed Jan. 31, 2013, whose disclosure is hereby incorporated by reference in its entirety into the present disclosure.

FIELD OF THE INVENTION

The present invention is directed to a golf tee and more particularly to an overmolded golf tee having more rigid and less rigid components.

DESCRIPTION OF RELATED ART

Golf tees are typically made of a rigid material such as wood or hard plastic, with a cup-shaped crown for holding the golf ball. Since the cup causes too much friction, it would be desirable to reduce that friction.

The "Zero Friction Tee" has three hard plastic prongs. The friction is minimized because there are only three points of contact. However, the prongs do not flex.

Bristle-brush tees have bristles that flex, but they are not durable.

It is known in the art to make a golf tee with a stake and a crown, in which the crown is made of a more flexible material than the stake. However, such golf tees either require complex manufacturing or are not durable, as the connection point between the stake and the crown tends to break.

SUMMARY OF THE INVENTION

It is therefore an object of the invention to provide a golf tee with a crown more flexible than the stake, the golf tee being durable and easy to manufacture.

To achieve the above and other objects, the present invention is directed to a golf tee having a stake made of a first material and a crown made of a second material more flexible than the first material, in which the crown is overmolded over the stake. The crown and the stake can have corresponding projections. The stake can have flanges to allow the crown and the stake to hold together better.

In either of the preferred embodiments, or in any other embodiment, a stake is formed, and then a crown is overmolded over the stake. The stake can have flanges that engage with the overmolded crown for greater durability. The crown preferably has flexible projections, and the stake may or may not have projections corresponding to those of the crown.

The crown can be overmolded in any suitable manner. The general concept of overmolding is known in the art and will therefore not be described in detail here. The crown can be made of a flexible elastomer such as LDPE or TPU. The stake can be made of a rigid polymer such as nylon or another hard plastic. Of course, other materials could be used.

The crown can be molded to include a tee height indicator. In that case, the user knows to insert the tee into the ground up to the tee height indicator.

The present golf tee is similar to that of US 2008/0182684 A1, whose disclosure is hereby incorporated by reference in its entirety into the present disclosure. Aspects of that previous golf tee can be incorporated into the present golf tee.

BRIEF DESCRIPTION OF THE DRAWINGS

Preferred embodiments will be set forth with reference to the drawings, in which.

DETAILED DESCRIPTION OF THE PREFERRED EMBODIMENTS

Figure 1:
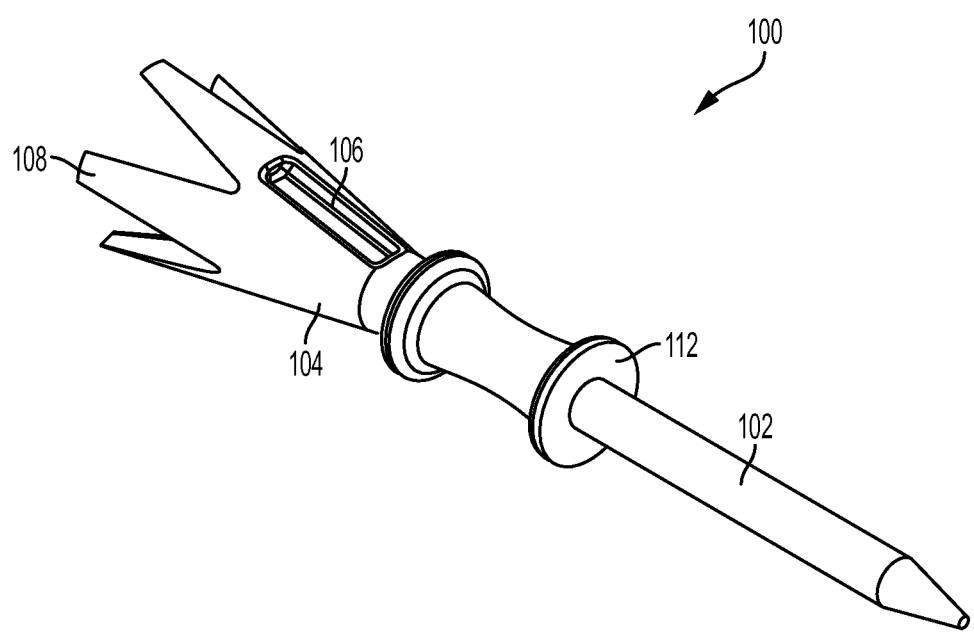
FIG. 1 is a drawings showing a perspective view from the bottom of a golf tee according to a first preferred embodiment.
Figure 2:
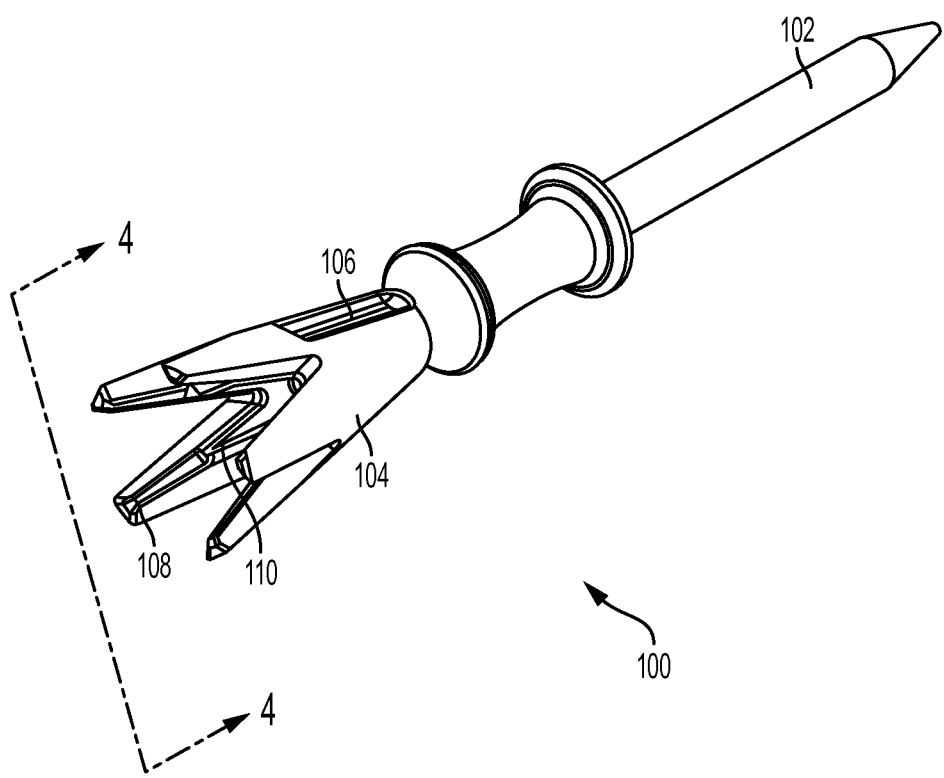
FIG. 2 is a drawing showing a perspective view from the top of the golf tee according to the first preferred embodiment.
Figure 3:
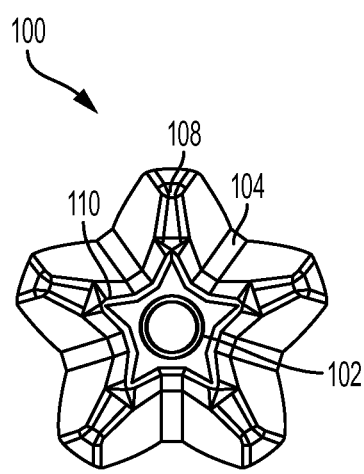
FIG. 3 is a drawing showing a top view of the golf tee according to the first preferred embodiment.
Figure 4:
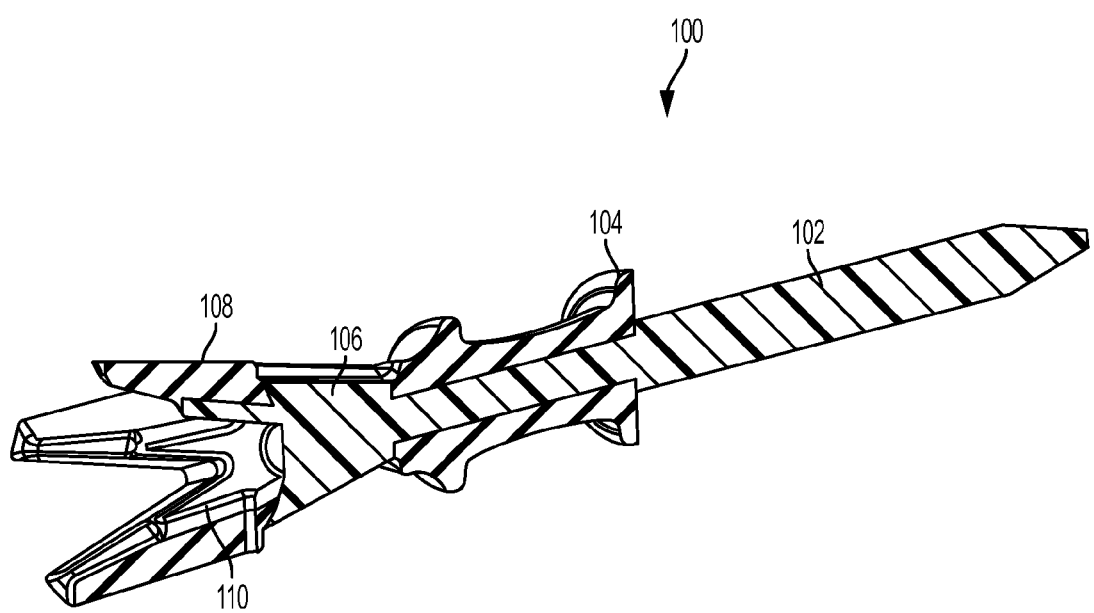
FIG. 4 is a drawing showing a perspective sectional view of the golf tee according to the first preferred embodiment taken along lines IV-IV in FIG. 2.
Figure 5:
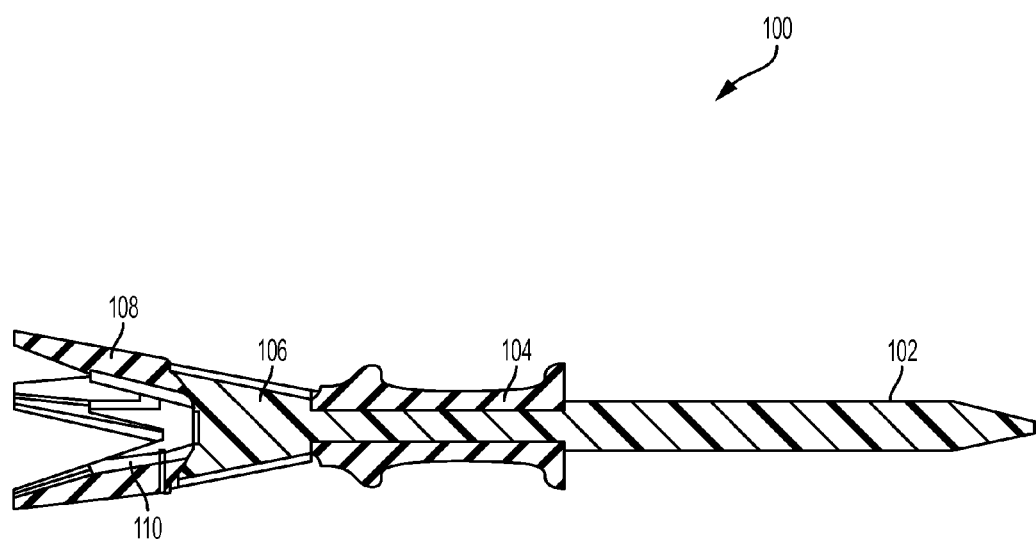
FIG. 5 is a drawing showing a side sectional view of the golf tee according to the first preferred embodiment taken along lines IV-IV in FIG. 2.
Figure 6:
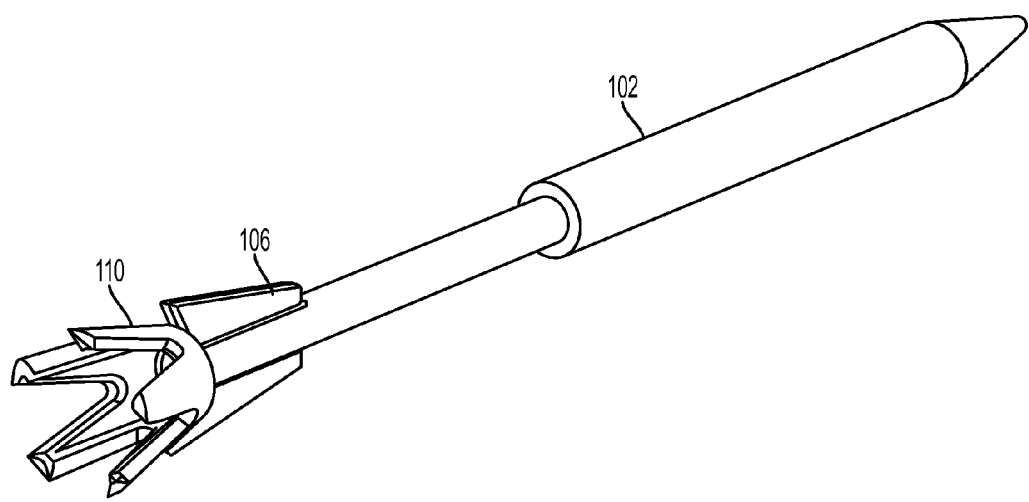
FIG. 6 is a drawing showing a perspective view of a stake in the golf tee according to the first preferred embodiment.

Preferred embodiments of the present invention will be set forth in detail with reference to the drawings, in which like reference numerals refer to like elements or steps throughout.

Figure 7:
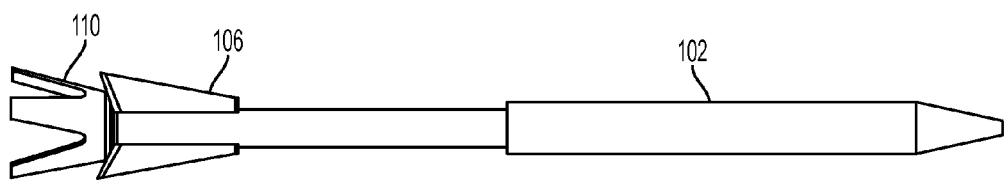
FIG. 7 is a drawing showing a side view of the stake in the golf tee according to the first preferred embodiment.
Figure 8:
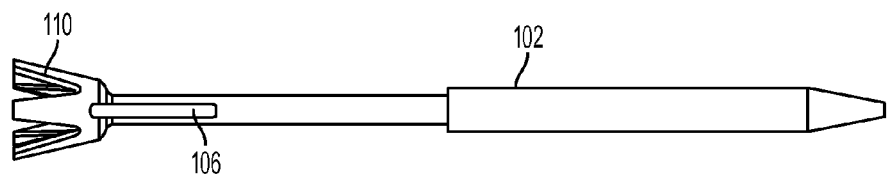
FIG. 8 is a drawing showing another side view of the stake in the golf tee according to the first preferred embodiment rotated 90° about its long axis from the view of FIG. 7.
Figure 9:
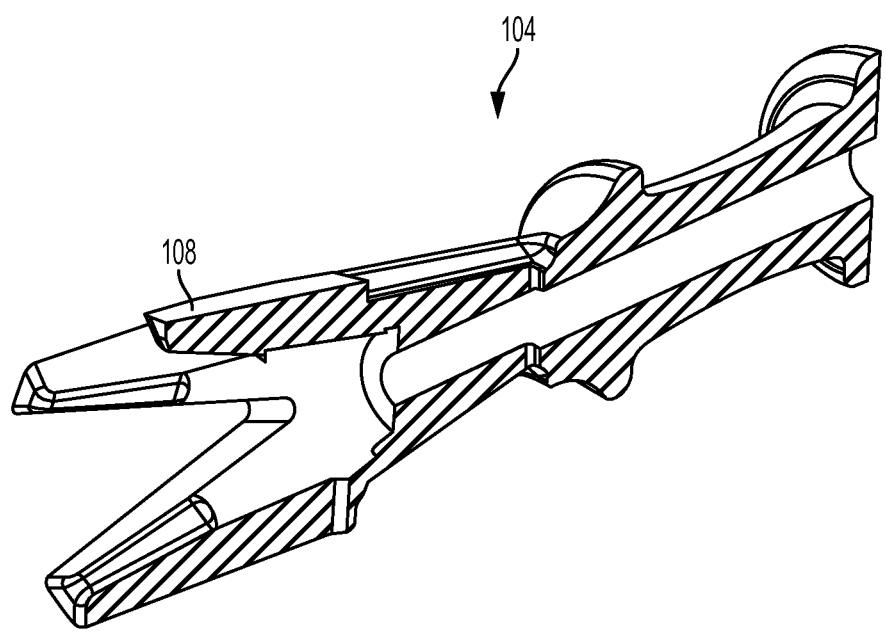
FIG. 9 is a drawing showing a perspective sectional view of a crown of the golf tee according to the first preferred embodiment taken along lines IV-IV in FIG. 2.
Figure 10:
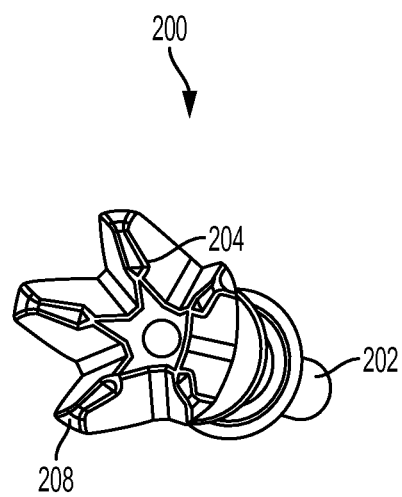
FIG. 10 is a drawing showing a perspective view from the top of a golf tee according to a second preferred embodiment.
Figure 11:
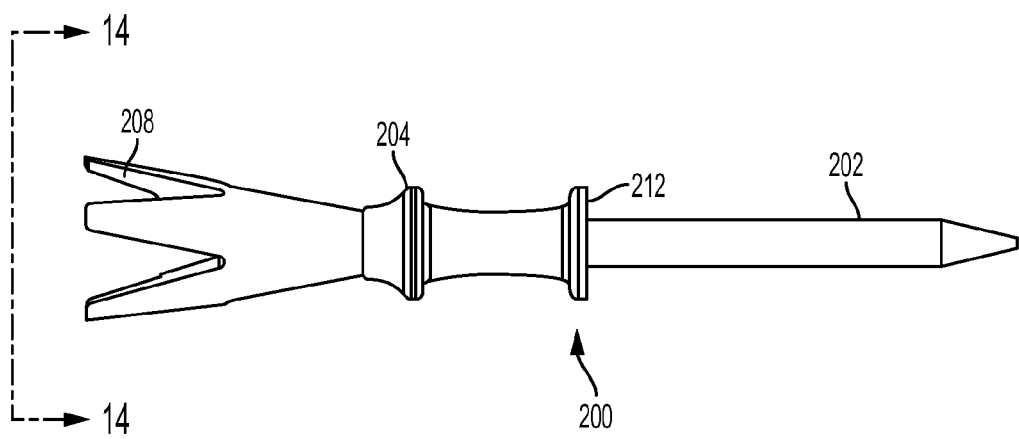
FIG. 11 is a drawing showing a side view of the golf tee according to the second preferred embodiment.
Figure 12:
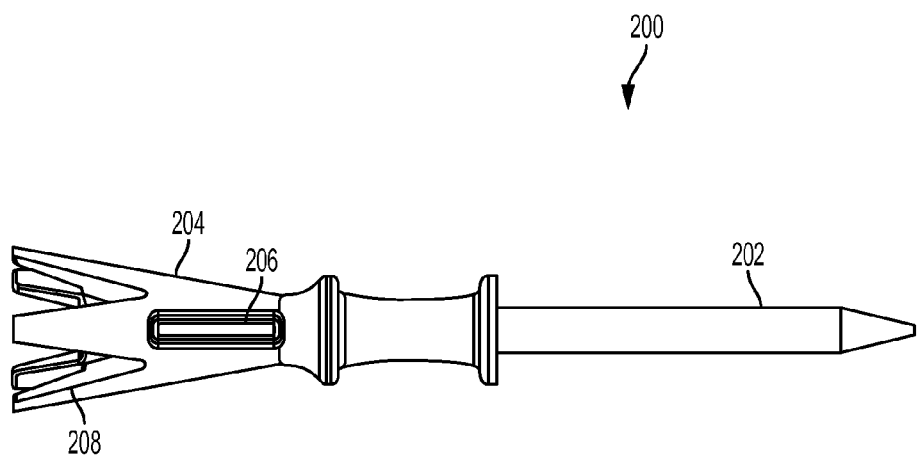
FIG. 12 is a drawing showing another side view of the golf tee according to the second preferred embodiment rotated 90° about its long axis from the view of FIG. 11.

FIGS. 1-9 show an overmolded golf tee 100 according to a first preferred embodiment. The golf tee 100 has a stake 102 formed of a first material and a crown 104 formed of a second material overmolded onto the stake 102. The stake 102 has one or more longitudinal flanges 106 formed therein to engage with the crown 104. Each flange 106 preferably tapers outwardly toward the crown, as best seen in FIG. 7. The flanges 106 extend into the crown 104 to hold the crown 104 in place relative to the stake 102. The crown 104 has projections 108 that form the topmost part of the tee 100 when the tee 100 is in use and that engage a golf ball (not shown). The stake 102 has projections 110 corresponding to the projections 108 of the crown 104. The crown 104 also has a tee height indicator 112.

Figure 13:
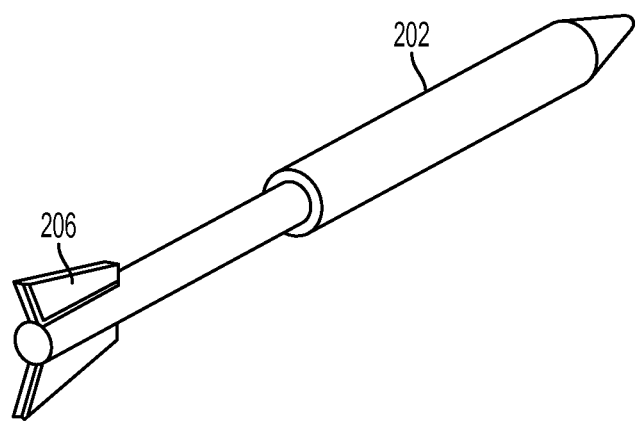
FIG. 13 is a drawing showing a perspective view from the top of a stake in the golf tee of the second preferred embodiment.
Figure 14:
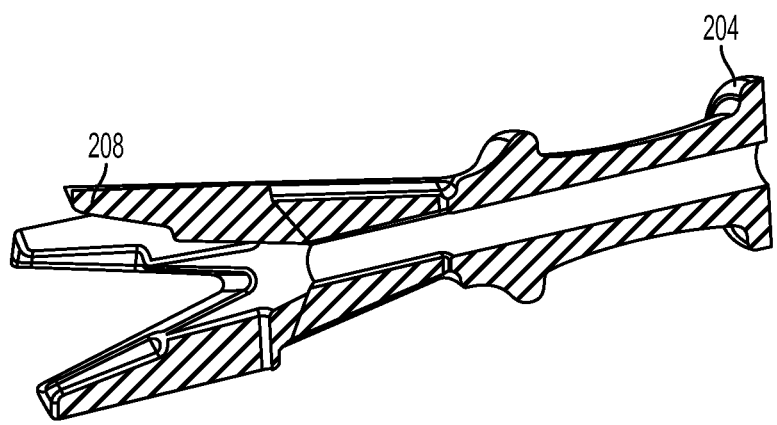
FIG. 14 is a drawing showing a perspective sectional view of a crown of the golf tee of the second preferred embodiment taken along lines XIV-XIV in FIG. 11.
Figure 15:
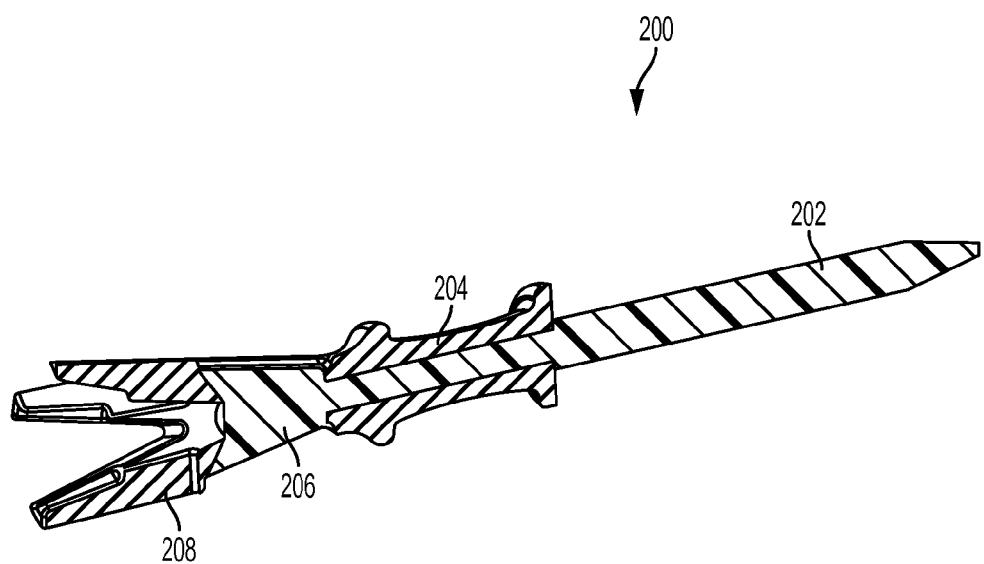
FIG. 15 is a drawing showing a perspective sectional view of the golf tee of the second preferred embodiment taken along lines XIV-XIV in FIG. 11.

FIGS. 10-15 show an overmolded golf tee 200 according to a second preferred embodiment. The golf tee 200 has a stake 202 formed of a first material and a crown 204 formed of a second material overmolded onto the stake 202. The stake 202 has longitudinal flanges 206 formed therein to engage with the crown 204. Each flange 206 preferably tapers outwardly toward the crown, as best seen in FIG. 13 The flanges 206 extend into the crown 204 to hold the crown 204 in place relative to the stake 202. The crown 204 has projections 208 that form the topmost part of the tee 200 when the tee 200 is in use and that engage a golf ball (not shown). The crown 204 also has a tee height indicator 212. However, the golf tee 200 according to the second preferred embodiment differs from that of the first preferred embodiment in that the stake 202 does not have projections corresponding to the projections 208 of the crown 204.

In either of the preferred embodiments, or in any other embodiment, the stake 102 or 202 is molded first. The flanges 106 or 206 are molded with the rest of the stake 102 or 202 as a single piece and are positioned to facilitate molding. Then, the crown 104 or 204 is overmolded onto the stake 102 or 202.

In production, first, the stake 102 or 202 is molded of a rigid polymer such as nylon. Then, overmolding molds are assembled over the stake to overmold the crown 104 or 204 of a flexible elastomer such as LDPE or TPU over the stake 102 or 202 to form the golf tee 100 or 200.

While preferred embodiments have been set forth above, those skilled in the art who have reviewed the present disclosure will readily appreciate that other embodiments can be realized within the scope of the invention. For example, disclosures of specific numbers of projections, flanges, and the like are illustrative rather than limiting, as are disclosures of specific materials. Therefore, the present invention should be construed as limited only by the appended claims.

What is claimed is:

1. A golf tee comprising:
   a stake formed of a first material, the stake having at least one longitudinal flange and
   a crown overmolded over the stake, the crown being formed of a second material that is more flexible than the first material, and the crown having a plurality of projections for supporting a golf ball,
   wherein the longitudinal flange of the stake engages the crown, and the stake has a plurality of projections corresponding to the plurality of projections of the crown.

2. The golf tee of claim 1, wherein the stake does not have a plurality of projections corresponding to the plurality of projections of the crown.

3. The golf tee of claim 1, wherein the crown comprises a tee height indicator.

4. The golf tee of claim 1, wherein the stake has a plurality of flanges extending into the crown.

5. The golf tee of claim 1, wherein the first material comprises a rigid polymer.

6. The golf tee of claim 1, wherein the second material comprises an elastomer.

7. A method of making a golf tee, the method comprising:
   (a) providing a stake formed of a first material, the stake having at least one longitudinal flange; and
   (b) overmolding a crown over the stake such that the longitudinal flange of the stake engages the crown, the crown being formed of a second material that is more flexible than the first material, and the crown having a plurality of projections for supporting a golf ball, and
   forming the stake to comprise a plurality of projections corresponding to the plurality of projections of the crown.

8. The method of claim 7, wherein step (a) comprises forming the stake not to comprise a plurality of projections corresponding to the plurality of projections of the crown.

9. The method of claim 7, wherein step (b) comprises forming the crown to comprise a tee height indicator.

10. The method of claim 7, wherein step (a) comprises forming the stake to comprise a plurality of flanges extending into the crown.

11. The method of claim 7, wherein the first material comprises a rigid polymer.

12. The method of claim 7, wherein the second material comprises an elastomer.

13. A golf tee, comprising:
    a stake formed of a first material; and
    a crown overmolded over the stake, the crown being formed of a second material that is more flexible than the first material, and the crown having a plurality of projections for supporting a golf ball,
    wherein the stake has a plurality of projections corresponding to the plurality of projections of the crown.

14. A method of making a golf tee, the method comprising:
    providing a stake formed of a first material; and
    overmolding a crown over the stake, the crown being formed of a second material that is more flexible than the first material, and forming the crown to have a plurality of projections for supporting a golf ball; and
    forming the stake to comprise a plurality of projections corresponding to the plurality of projections of the crown.

15. The golf tee of claim 1, wherein the longitudinal flange tapers outwardly toward the crown.

16. The method of claim 7, wherein the longitudinal flange tapers outwardly toward the crown.

* * * * *